United States Patent

[11] 3,621,005

[72] Inventors Morizo Ishidate;
Kenji Yusawa, both of Tokyo, Japan
[21] Appl. No. 753,774
[22] Filed Aug. 19, 1968
[45] Patented Nov. 16, 1971
[73] Assignee Zaidan Hojin Tokyo Seikagaku
Kenayukai, Tokyo, Japan
[32] Priority Aug. 21, 1967
[33] Japan
[31] 42/53277

[54] PPD-S (TUBERCULIN PROTEIN) COMBINED WITH GLUCURONIC ACID AND METHOD FOR PREPARING THE SAME
4 Claims, No Drawings
[52] U.S. Cl. .................................................. 260/112 R,
424/92, 424/177
[51] Int. Cl. .................................................. A61k 27/14,
C07g 7/00

[50] Field of Search .......................................... 424/92;
260/112

[56] References Cited
FOREIGN PATENTS
919,782 2/1963 Great Britain ................ 424/92
OTHER REFERENCES
The Dispensatory of the United States of America, 25th ed., published by J. B. Lippincott Co., Phila., 1955, pages 1,461–1,463

Primary Examiner—Howard E. Schain
Attorney—Cushman, Darby & Cushman

ABSTRACT: Tuberculin protein (hereinafter referred to as "PPD-S" in such a sense as a purified protein derivative) combined with glucuronic acid has less side effect and is chemically stable. The PPD-S combined with glucuronic acid is prepared by treating PPD-S with glucuronic acid metal salt, such as sodium glucuronate or potassium glucuronate, or with glucuronolactone.

PPD-S (TUBERCULIN PROTEIN) COMBINED WITH GLUCURONIC ACID AND METHOD FOR PREPARING THE SAME

This invention relates to PPD-S combined with glucuronic acid hereinafter referred to a GA-PPD-S and a method for preparing the same.

For the treatment of tuberculosis, attention has come to be paid to the curative effects attained by the combination use of old tuberculin, which is obtained from a culture filtrate of the tubercle bacillus, with antituberculous drugs.

However, tuberculin has so strong adverse effects on tuberculous patients that it is not usable as a therapeutic. The old tuberculin diagnosis a complicated mixture of protein, polysaccharide, nucleic acid and the like.

According to recent researches, it was recognized that PPD-S is the active principle of the old tuberculin and is used for the diagnosis of tuberculosis in place of the old tuberculin. PPD-S might be useful for the treatment of tuberculosis, as in the case of the old tuberculin, but is not promising due to undesirable effect.

An object of the present invention is to provide GA-PPD-S which is chemically stable and has less side effects.

Another object of the invention is to provide a method for preparing the said GA-PPD-S.

In accordance with the present invention, GA-PPD-S is prepared by treating PPD-S with a glucuronic acid metal salt such as, for example, sodium glucuronate or potassium glucuronate, or with glucuronolactone. More particularly, the said GA-PPD-S is obtained by adding the glucuronate or glucuronolactone to PPD-S, dissolving the mixture in a neutral or weakly alkaline buffer solution (pH 7–9) in an amount as small as possible but capable of dissolving the mixture, allowing the solution to react at 30°–50° C. for 2–14 days, dialyzing the resulting reaction mixture, filtering the dialyzed mixture and then subjecting the filtrate to lypophilization.

The glucuronate or glucuronolactone is desirably used in 1–10 times, preferably 2–5 times, the amount of PPD-S. As the buffer agent for dissolving the aforesaid mixture, there is used, for example, tris(hydroxymethyl)-aminomethane, phosphate, diethyl barbiturate or carbonate. At a low temperature, the reaction requires a long period of time, while at a high temperature, the reaction is sufficiently effected in a relatively short period of time. It is desirable to effect the reaction at 35°–40° C. for 4–5 days. If the reaction temperature is elevated to 50° C. or more, there is brought about a danger of denaturation of the protein. The reaction mixture is dialyzed against distilled water to remove unreacted glucuronate or glucuronolactone and salts. Subsequently, insoluble precipitates are removed by filtration, and the filtrate is subjected to lyophilization to obtain GA-PPD-S as a white powder. Further, when the dialized reaction mixture is purified by column chromatography using Sephadex, e.g. G75 to 25, (cross-linked dextran gels produced by Pharmacia Fine Chemicals, Uppsala, Sweden), unreacted gluconate and PPD-S low in binding ratio to glucuronic acid, can advantageously be removed. In this case, eluate is dialized, filtered and lyophilized. The product obtained through the said purification using Sephadex is extremely high in purity.

The product obtained in the present invention is prepared by the treatment of PPD-S with $^{14}$C-labeled sodium glucuronate or glucuronolactone, followed by dialyzation and then subjecting to column chromatography on Sephadex. Subsequently, the content of PPD-S in the fraction is measured by ultraviolet absorbance at 280 m$\mu$ and the content of glucuronic acid is measured by radioactivity, whereby the elution curve of glucuronic acid of the present product is quite similar to that of PPD-S. This fact suggests that the present product contains glucuronic acid not as a contaminant but as a chemically bound component. The binding ratio between glucuronic acid and PPD-S in the present product varies depending on the composition of reaction mixture and on the reaction time as well as temperature. However, when a mixture comprising, for example, PPD-S and two times the amount thereof of sodium glucuronate is reacted at a neutral pH at 37° C. for 96 hours, it is understood that about 7–8 percent, based on the total amount of nitrogen in PPD-S, of glucuronic acid has combined with PPD-S. This binding ratio is nearly identical with the ratio calculated from the decrease of nitrogen content, which is determined by Duma method, of the present product from PPD-S. Further, when the present product is subjected to paper electrophoresis using a Veronal buffer at pH 8.6 and to disc electrophoresis on polyacrylamide using tris-glycine buffer at pH 8.9, the electrophoretical mobility of the present product is greater, in both cases, than that of PPD-S. From this, it is inferred that in the case of the present product, the isoelectric point has somewhat shifted to the acidic side. Further, when the isoelectric point of the present product is measured according to the electrofocusing method using ampholytes as carrier which has recently been developed, it is 3.5 to 4.0 while that of PPD-S is 4.5–4.7. This fact coincides with the result of the above-mentioned electrophoresis. On the base of this finding, it seems to be reasonable that the Carboxyl group derived from glucuronic acid in GA-PPD-S is in the free form. Further, in view of the reaction of ovalhumine with glucuronic acid, it is considered that the glucuronic acid is bound to the $\omega$-amino group of side chains in the protein.

The following examples illustrate the present invention.

EXAMPLE 1

PPD-S was prepared from the culture filtrate of a human-type tubercle bacillus strains Aoyama B according to the process of F. B. Seibert et al. [American Review of Tuberculosis, 44, 9 (1941)]. This PPD-S contained 12 percent or more nitrogen as total nitrogen content which is measured by Duma method, 5 percent or less of polysaccharide content as glucose measured by anthrone reaction, and 1.5 percent or less of nucleic acid content calculated in terms of 2-desoxy D-ribose measured by diphenylamine reaction. Further, the PPD-S had a molecular weight of 20,000 to 45,000 and an isoelectric point of 4.5–4.7, and showed a molar ratio of acidic amino acids to basic amino acids of 2–3:1.

One hundred mg. of the thus-obtained PPD-S was treated with 200 mg. of sodium glucuronate. To the mixture, 5.0 ml. of M/3 phosphate buffer (pH 7.2) and a small amount of thimerosal as an antiseptic were added. The solution was allowed to stand at 37° C. for 96 hours and was then dialyzed against distilled water at 5° C. or below for 3 days. Thereafter, the reaction mixture was purified by column chromatography using Sephadex C50 to obtain about 80 mg. of sodium glucuronate-combined PPD-S.

On the other hand an experiment was effected under the same conditions as above, except that $^{14}$C-labeled sodium glucuronate instead of nonlabeled glucuronate was used. PPD-S content of the resulting substance was measured by optical density measurement at 280 m$\mu$; polysaccharide content by anthrone reaction; nucleic acid content by diphenylamine reaction; combined glucuronic acid content by $^{14}$C-radioactivity measurement; and free glucuronic acid content by naphthoresorcinol reaction. As the result, it was found that 7–8 percent, based on the total nitrogen content of PPD-S, of glucuronic acid was combined with the PPD-S.

EXAMPLE 2

Two hundred mg. of glucuronolactone was hydrolyzed with a calculated amount of sodium hydroxide under ice cooling. To the solution was added M/3 phosphate buffer (pH 7.0), and the volume was made to 5.0 ml. Then, 100 mg. of PPD-S, and a small amount of thimerosal were added, and the solution was allowed to stand at 37° C. for 14 days and was then dialyzed against distilled water at 5° C. or below. Thereafter, the reaction mixture was purified by column chromatography on Sephadex G75 to obtain about 185 mg. of sodium glucuronate-combined PPD-S. The substance thus obtained was examined in the same manner as in example 1 to find that 10–13 percent, based on the total nitrogen content of PPD-S, of glucuronic acid had combined with the PPD-S.

EXAMPLE 3

One hundred mg. of PPD-S was treated with 500 mg. of sodium glucuronate. To the mixture, a small amount of M/5 phosphate buffer (pH 7.4) and a small amount of themerosal as an antiseptic were added. The solution was allowed to stand at 37° C. for 120 hours and was then dialyzed against of M/45 phosphate buffer (pH 7.4). Subsequently, the reaction mixture was purified in the same manner as in example 2 to obtain about 70 mg. of a sodium glucuronate-combined PPD-S. The substance thus obtained was examined in the same manner as in example 1 to find that glucuronic acid was combined with the PPD-S.

EXPERIMENTAL EXAMPLE

The results of comparison in side effect (allergy reaction; shock death and skin test) between the GA-PPD-S and PPD-S itself indicated that GA-PPD-S is more excellent.

The experiment was effected in the following manner:

Guinea pigs were subcutaneously infected with a human-type tubercle bacillus kurono strain. The animals which had elapsed, after the infection, the periods set forth in the table, were divided into 3 groups and were individually injected subcutaneously with a definite amount of a solution of each of PPD-S, GA-PPD-S and PPD-S treated in the same manner without glucuronic acid. The number of animals dead within 48 hours after the injection was counted with the result shown in the table below. The tuberculin reactions (skin test) of the said three prepared against tuberculous animals were examined, but in this connection no significant difference was recognized among the three preparations.

jected subcutaneously or intramuscularly twice, a week with the GA-PPD-S. The dose of GA-PPD-S used was initially 0.2 mcg. and then increased step by step in the consecutive injections, taking symptoms and conditions of patients into consideration. According to the observation for a therapy period of 3 to 12 months, the number of cases where caseous materials were removed from tuberculoma to result in decrease of cavity size was greater in the combination treatment group than in the chemotherapy alone group. Further, it seemed that the period up to improvement was shorter in the combination treatment.

In addition, by the cultivation test of tubercle bacillus from the sputum of patients, negative cases were observed in larger number in the combination group than in the chemotherapy alone group.

Unfavorable side effects have not been observed so far as the combination therapy of the present products with chemotherapeutics was performed carefully as above mentioned.

What is claimed is:

1. A method for preparing PPD-S chemically bound with glucuronic acid comprising dissolving a mixture of a glucuronate or glucuronolactone with PPD-S in a neutral or weakly alkaline buffer solution at a pH of 7 to 9 in an amount as small as possible, the amount ratio of PPD-S to the glucuronate or glucuronolactone being from 1:1 to 1:10, allowing the solution to react at 30°–50° C. for 2–14 days, dialyzing the resulting reaction mixture, filtering the dialyzed mixture, and subjecting the filtrate to lyophilization.

2. A method according to claim 1 including the steps of purifying the dialyzed mixture using a cross-linked dextran gel, again dialyzing the purified mixture and lyophilizing the thus purified mixture.

3. A method according to claim 1 wherein the ratio of PPD-S to glucuronate or glucuronolactone is 1:2 to 1:5.

4. The product prepared by the method of claim 1.

ALLERGIC SHOCK DEATH OF TUBERCULOUS ANIMALS BY INJECTION OF PPD-S AND GA-PPD-S

| | Experiment | | | | | | | | |
|---|---|---|---|---|---|---|---|---|---|
| | I | | | II | | | III | | |
| | Weeks after infection | | | | | | | | |
| | (5) | | | (9) | | | (11) | | |
| Group | A | B | C | A | B | C | A | B | C |
| No. of dead animals/No. of animals tested | 14/15 | 12/15 | 15/15 | 6/12 | 1/12 | 5/11 | 7/7 | 1/7 | 3/7 |
| Death rate, percent | 93 | 80 | 100 | 50 | 8 | 45 | 100 | 14 | 43 |

NOTE:
A group—PPD-S (1.00 mg./kg. of body weight).
B group—GA-PPD-S (1.07 mg./kg.).
C group—PPD-S treated without glucuronic acid (1.01 mg./kg.).

As to the clinical results the use of GA-PPD-S in combination with antituberculous drugs are more effective than the treatment of the antituberculous drugs alone.

That is, 105 patients of tuberculosis were administered with such antituberculous drugs as streptomycin, sodium P-aminosalicylate and isonicotinic acid hydrazid, and were in-

UNITED STATES PATENT OFFICE
CERTIFICATE OF CORRECTION

Patent No. 3,621,005　　　　　　　　Dated November 16, 1971

Inventor(s) Morizo Ishidate and Kenji Yusawa

It is certified that error appears in the above-identified patent and that said Letters Patent are hereby corrected as shown below:

Cover Sheet:

Item 73, "Kenayukai" should be changed to

--Kenkyukai--.

Signed and sealed this 30th day of May 1972.

(SEAL)
Attest:

EDWARD M. FLETCHER, JR.　　　　　ROBERT GOTTSCHALK
Attesting Officer　　　　　　　　Commissioner of Patents